United States Patent [19]

Elias et al.

[11] Patent Number: 5,211,130
[45] Date of Patent: May 18, 1993

[54] LOVE BED

[76] Inventors: Elly I. Elias; Elvira Elias, both of P.O. Box 278, Forest Hills, N.Y. 11375

[21] Appl. No.: 935,190
[22] Filed: Aug. 26, 1992
[51] Int. Cl.[5] ............................................. A01K 1/00
[52] U.S. Cl. ........................................ 119/28.5; 5/58
[58] Field of Search ................... 119/28.5, 15, 17; 5/503.1, 504.1, 931, 8, 58

[56] References Cited

U.S. PATENT DOCUMENTS

| D. 45,708 | 5/1914 | Giordano | 5/58 |
|---|---|---|---|
| D. 89,646 | 4/1933 | Larson | 119/28.5 |
| 1,327,941 | 1/1920 | Camp | 5/58 |
| 2,267,176 | 12/1941 | Turner | 5/58 |
| 2,659,344 | 11/1953 | Herbert | 119/28.5 |
| 3,618,568 | 2/1971 | Breeden | 119/28.5 |
| 3,989,008 | 11/1976 | Neumann | 119/28.5 |

FOREIGN PATENT DOCUMENTS 2206272  1/1989  United Kingdom ............ 119/28.5

Primary Examiner—John G. Weiss
Attorney, Agent, or Firm—Michael I. Kroll

[57] ABSTRACT

The present invention relates to a love bed. The love bed includes a box-shaped bed frame having a top recess area, area in the bed frame for storage, the bed frame has a hollow compartment with a front and side opening therein, a door hinged along its top edge to the bed frame in the front opening of the compartment, and a drawer that slideably fits into the side opening in the compartment.

12 Claims, 3 Drawing Sheets

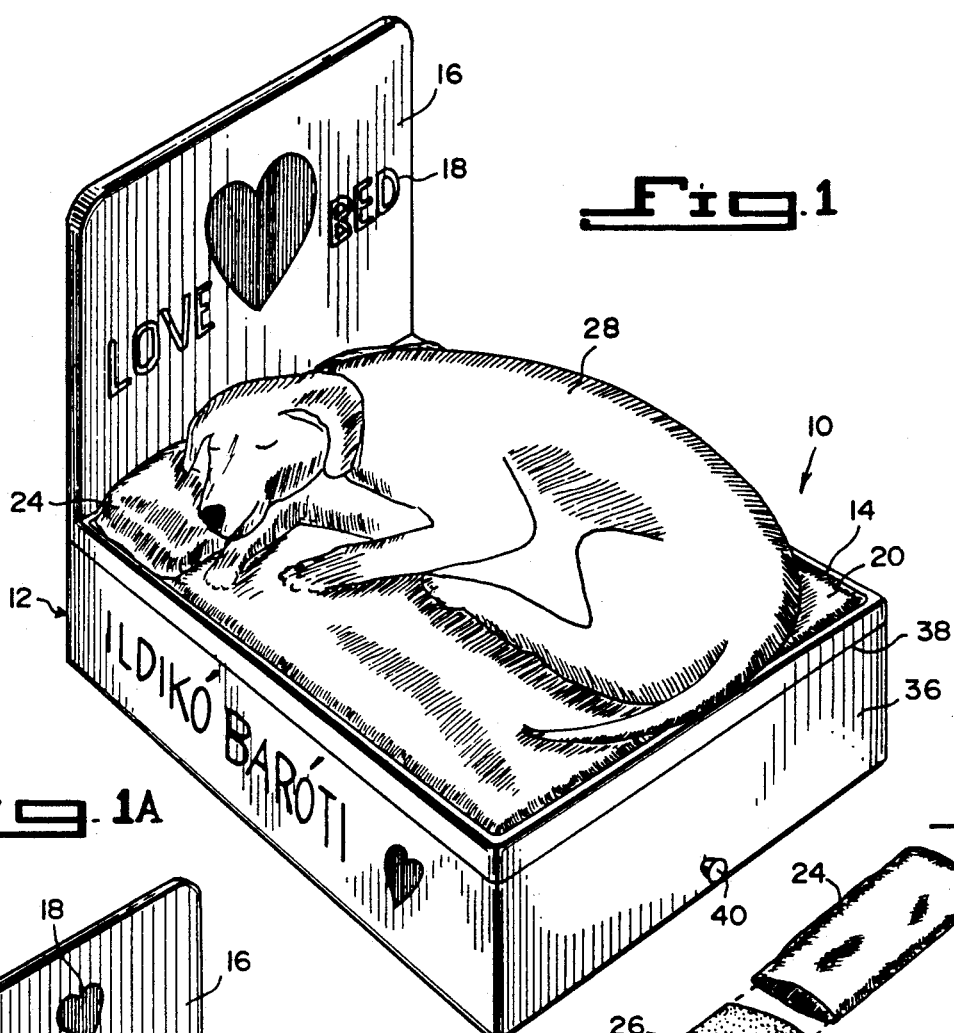
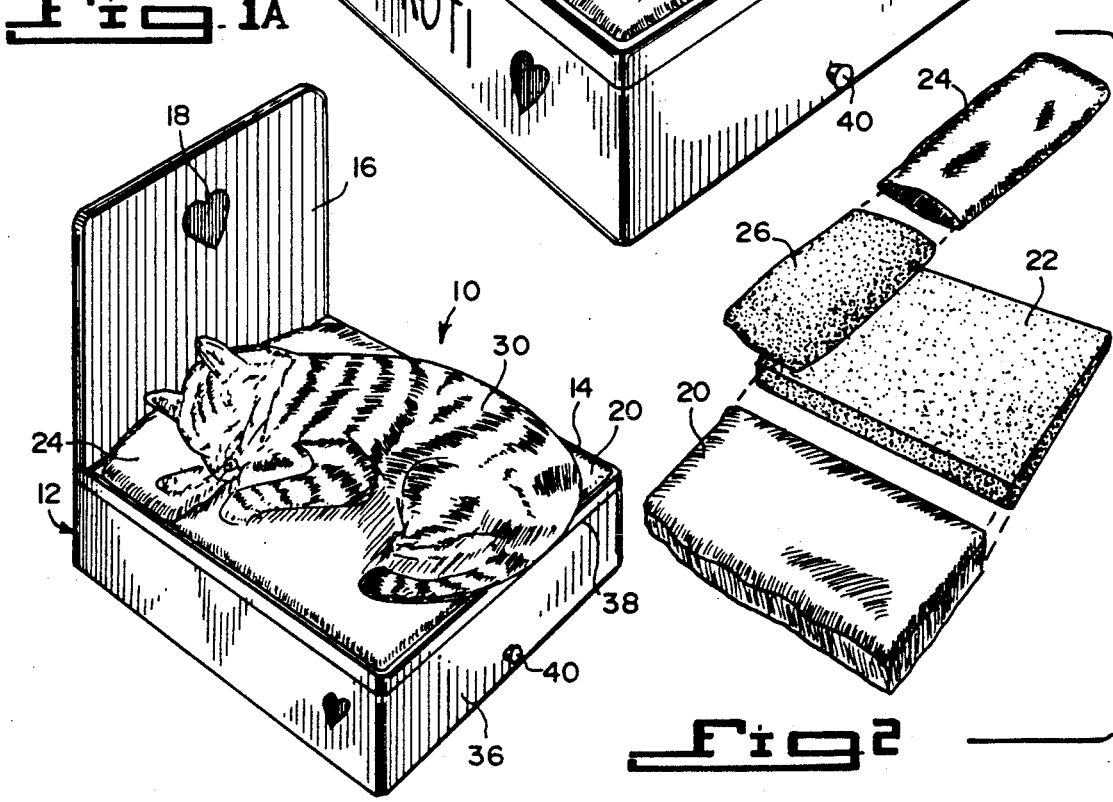

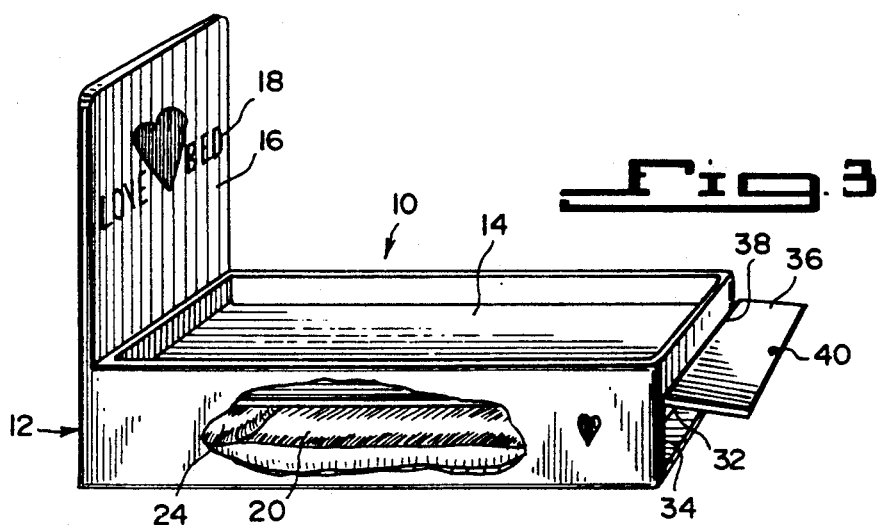
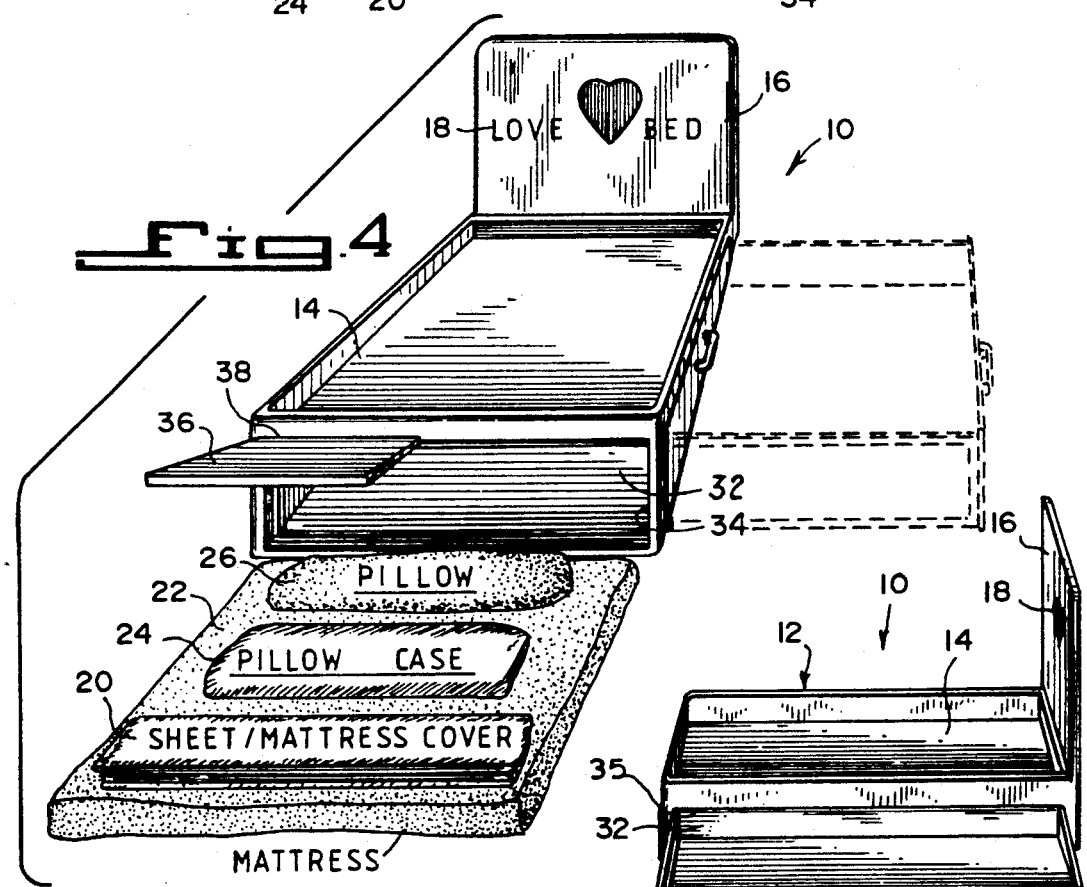
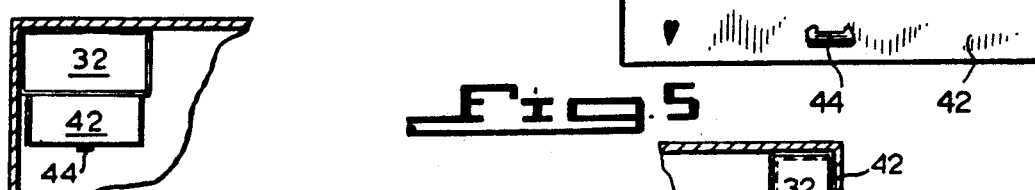
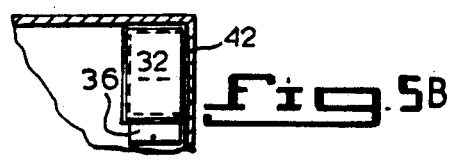

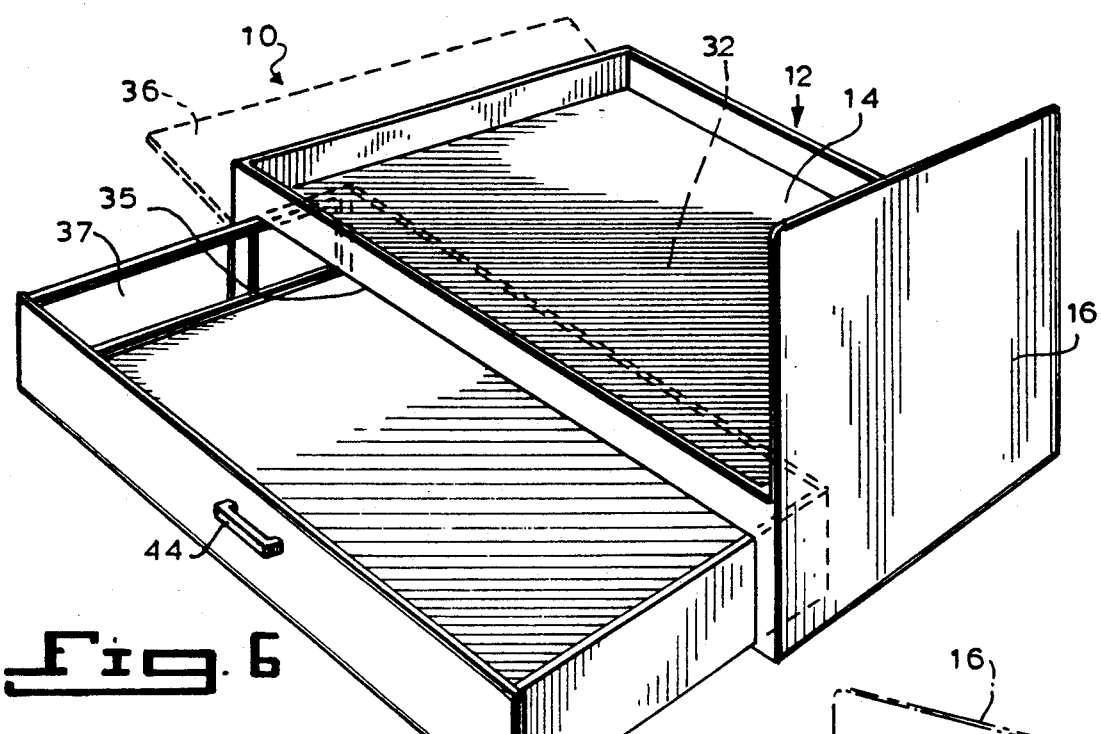
Fig. 6
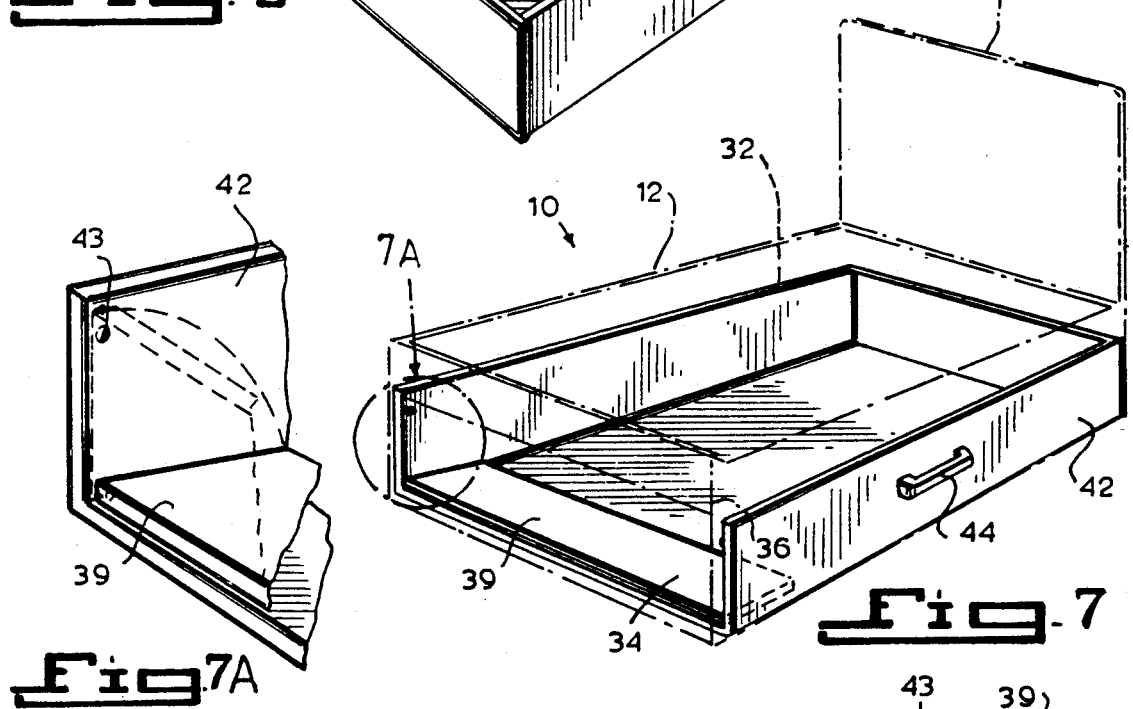
Fig. 7
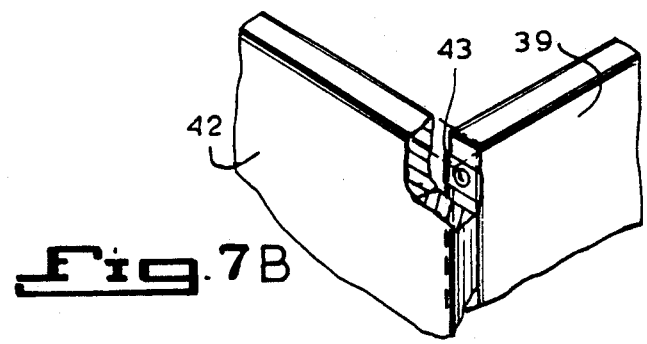
Fig. 7A
Fig. 7B
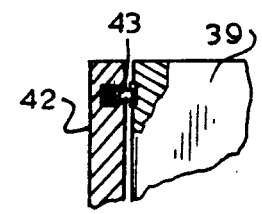
Fig. 7C

LOVE BED

BACKGROUND OF THE INVENTION

1. Field of the Invention

The instant invention relates generally to pet accessories and more specifically it relates to a love bed.

2. Description of the Prior Art

Numerous pet accessories have been provided in prior art that are adapted to include different types of beds so that animals can recline and sleep thereon. While these units may be suitable for the particular purpose to which they address, they would not be as suitable for the purposes of the present invention as heretofore described.

SUMMARY OF THE INVENTION

A primary object of the present invention is to provide a love bed that will overcome the shortcomings of the prior art devices.

Another object of the present invention is to provide a love bed that will allow a dog or cat to sleep on the bed that is similar to a regular bed used by people.

An additional object of the present invention is to provide a love bed in which the bed has a hidden storage compartment built into the bed frame for storing bedding and the like therein.

A further object of the present invention is to provide a love bed whose hidden storage compartment has two accesses depending upon the love bed's placement in a room.

Another object of the present invention is that the love bed comes in three sizes small, medium, and large.

Yet another object of the present invention is that the sheets for the love bed can be designer sheets and can contain stripes and/or patterns.

A still further object of the present invention is to provide a love bed that is economical in cost to manufacture.

Further objects of the present invention will appear as the description proceeds.

In keeping with these objects, and with others which will become apparent hereinafter, one feature of the present invention resides, briefly stated, in an improved pet animal bed, including a box-shaped bed frame having a top recess area, means in the bed frame for storage, the bed frame having a hollow compartment with a front and side opening therein, a door hinged along its top edge to the bed frame in the front opening of the compartment, and a drawer that slideably fits into the side opening in the compartment.

In accordance with another feature of the present invention, the drawer in the opening of the compartment has a side that is missing so that accessibility to the compartment through the front opening is possible.

Another feature of the present invention is that the drawer in the opening of the compartment has a side that is hinged to the drawer bottom and is in the down position when accessibility to the compartment through the front opening is desired.

Yet another feature of the present invention is that the drawer in the opening of the compartment has a side that is hinged to the drawer bottom and is in the up position when accessibility to the compartment through the drawer is desired.

Still another feature of the present invention is that the side of the drawer in the up position is held up by clips.

Yet still another feature of the present invention is that it further comprises a removably mounted handle on the drawer to be gripped to pull out the drawer so a person can have access into the drawer from the side.

Still yet another feature of the present invention is that it further comprises a removably mountable knob on the door to be gripped to open the door so a person can have access into the compartment through the front.

Another feature of the present invention is that it further comprises a headboard extending upwardly from the bed frame and having indicia thereon.

Yet another feature of the present invention is that it further comprises a mattress to fit into the top recess area of the bed frame.

Still another feature of the present invention is that it further comprises a mattress cover to fit over the mattress.

Yet still another feature of the present invention is that it further comprises a pillow to be placed onto the mattress cover.

Still yet another feature of the present invention is that it further comprises a pillow case to fit over the pillow so that a pet animal can sleep on the love bed.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a front perspective view of the instant invention showing a dog sleeping thereon.

FIG. 1A is a front perspective view of the instant invention showing a cat sleeping thereon.

FIG. 2 is an exploded perspective view of the bedding on the love bed.

FIG. 3 is a side perspective view of the instant invention with the bed frame broken away and the front door open showing the bedding within the compartment.

FIG. 4 is a front perspective view showing the bedding ready to be inserted into the front access compartment in the love bed frame with the access in phantom.

FIG. 5 is a side perspective view of the pull out side drawer for storing the bedding therein.

FIG. 5A is a plan view showing the love bed placed where the front access is against the wall.

FIG. 5B is a plan view showing the love bed placed where the side access is against the wall.

FIG. 6 is an alternate embodiment of the love bed with the side part of the drawer missing and the front access door in phantom.

FIG. 7 is another alternate embodiment of the love bed where part of the drawer is foldable from a fully upright position to a fully flat position.

FIG. 7A is a perspective view of the love bed with the front side of the drawer folded down, the front side of the drawer shown fully erect in phantom, and the path taken of the front side of the drawer in phantom, in order to achieve these positions.

FIG. 7B shows in perspective the clips used to hold the front side of the drawer erect to the drawer with parts cut away.

FIG. 7C is a plan view of the clips used to hold the front side of the drawer erect with parts cut away.

DETAILED DESCRIPTION OF THE PREFERRED EMBODIMENTS

Turning now descriptively to the drawings, in which similar reference characters denote similar elements throughout the several views, the Figures illustrate an improved love bed 10 consisting of a box-shaped bed frame 12 having a top recess area 14. A headboard 16 extends upwardly from the bed frame 12 and has indicia 18 thereon, such as a heart with the words love bed. A mattress cover 20 fits over a mattress 22 that fits into the top recess area 14 of the bed frame 12. A pillow case 24 fits over a pillow 26 that is placed onto the mattress cover 20 so that a pet such as a dog 28 in FIG. 1 or a cat 30 in FIG. 1A can sleep on the love bed 10.

The mattress 22, the mattress cover 20, the pillow 26, and the pillow case 24 can all be stored within the bed frame 12. The bed frame 12 has a hollow compartment 32 with a front opening 34 and a side opening 35 therein. A door 36 is hinged along its top edge 38 to the bed frame 12 in the front opening 34 of the compartment 32. A knob 40 on the door 36 is to be gripped to open the door 36 so a person can have access into the compartment 32 through the front of the love bed 10.

The bed 10 is shown in FIG. 5, whereby the bed frame 12 has the hollow compartment 32 with the side opening 35 in addition to the front opening 34 therein. A drawer 42 slideably fits into the side opening 35 in the compartment 32. A removable mounted handle 44 is on the drawer 42 to be gripped to pull out the drawer 42 so a person can have access into the drawer.

In an alternate embodiment, shown in FIG. 6, the front side 37 of the drawer 42 is left open so that access through the front door 36 to the storage compartment 32 is possible if desired.

FIG. 7 shows another alternate embodiment wherein there is a piece 39 hinged to the front side of the bottom of the drawer 42. When the front side 39 is in the up position, as shown in phantom in FIGS. 7 and 7A, the drawer 42 is completely closed. When the piece 39 is down, the front opening 34 is accessible. When side 39 is up, access through the front door 36 is restricted, piece 39 is held up by spring loaded clips 43.

With the accessibility into the storage compartment 32 being dual, placement of the bed 10 in the room is not so limited, as shown in FIGS. 5B and 5C.

LIST OF REFERENCE NUMBERS 10 love bed
12 box-shaped bed frame
14 top recess area in 12
16 headboard
18 indicia on 16
20 mattress cover
22 mattress
24 pillow case
26 pillow
28 dog
30 cat
32 hollow compartment in 12
34 front opening in 32
35 side opening in 32
36 door
38 hinged top edge on 36
40 knob on 36
42 drawer
44 handle on 42

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An improved pet animal bed, comprising:
   a) a box-shaped bed frame having a top recess area;
   b) means in said bed frame for storage;
   c) said bed frame having a hollow compartment with a front and side opening therein;
   d) a door hinged along its top edge to the bed frame in said front opening of said compartment; and
   e) a drawer that slideably fits into said side opening in the compartment.

2. A bed as defined in claim 1, wherein said drawer in said side opening of said compartment has a side that is missing so that accessibility to said compartment through said front opening is possible.

3. A bed as defined in claim 1, wherein said drawer in said side of said compartment has a side that is hinged to said drawer bottom and is in the down position when accessibility to said compartment through said front opening is desired.

4. A bed as defined in claim 3, wherein said drawer in said side opening of said compartment has a side that is hinged to said drawer bottom and is in the up position when accessibility to said compartment through said drawer is desired.

5. A bed as defined in claim 4, wherein said side is held up by clips.

6. A bed as defined in claim 5; further comprising a handle on said drawer to be gripped to pull out said drawer so a person can have access into said drawer.

7. A bed as defined in claim 6; further comprising a knob on said door to be gripped to open said door so a person can have access into the compartment through said front opening.

8. A bed as defined in claim 7; further comprising a headboard extending upwardly from said bed frame and having indicia thereon.

9. A bed as defined in claim 8; further comprising a mattress to fit into said top recess area of said bed frame.

10. A bed as defined in claim 9; further comprising a mattress cover to fit over said mattress.

11. A bed as defined in claim 10; further comprising a pillow to be placed onto said mattress cover.

12. A bed as defined in claim 11; further comprising a pillow case to fit over said pillow so that a pet animal can sleep on said bed.

* * * * *